July 22, 1924.

H. F. AMMIDOWN 1,502,536

MAP MOUNTING AND MEANS FOR OPERATING IT

Filed July 2, 1923

WITNESSES

E. A. Wilson
Robert I. Hilsizer

INVENTOR

H. F. Ammidown

BY

Munn & Co.

ATTORNEYS

Patented July 22, 1924.

1,502,536

UNITED STATES PATENT OFFICE.

HARRY FRANK AMMIDOWN, OF SOUTHBRIDGE, MASSACHUSETTS.

MAP MOUNTING AND MEANS FOR OPERATING IT.

Application filed July 2, 1923. Serial No. 649,132.

*To all whom it may concern:*

Be it known that I, HARRY F. AMMIDOWN, a citizen of the United States, and a resident of Southbridge, in the county of Worcester and State of Massachusetts, have invented a new and Improved Map Mounting and Means for Operating It, of which the following is a full, clear, and exact description.

This invention relates to a map mounting and means for operating it. An object of the invention concerns the provision of a device which will enable aviators and similar persons quickly to determine a straight course between two points on a map which is disposed on a mounting.

An object is to provide means whereby maps of all kinds, including small detail maps, can be very readily observed so that the most minute details thereof can be brought under the easy observation of the person using the device.

A further object concerns the provision of means whereby while observing one portion of the map another portion or course can be very quickly brought into view by a minimum amount of manipulation of the parts.

The invention is illustrated in the drawings, of which—

Figure 1:
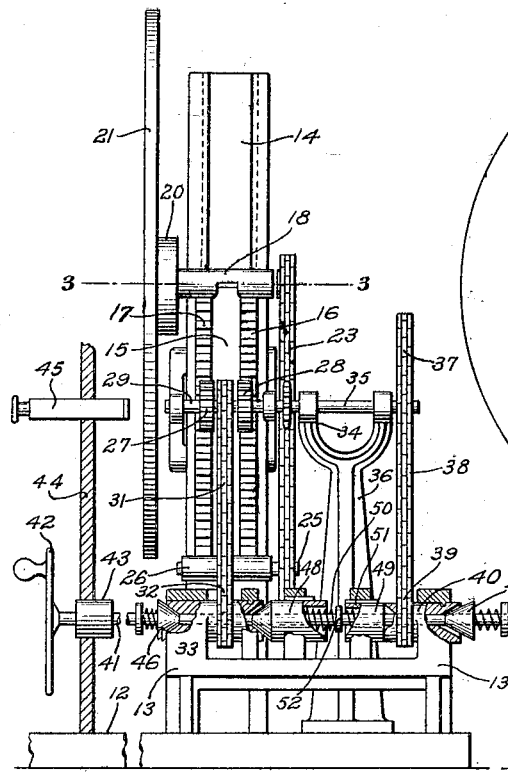
Fig. 1 is a side elevation of another form of the device.

The form of the invention shown in the drawings is a preferred form, although it is understood that modifications in the construction and arrangement of the parts and in the character of the materials used may be adopted without departing from the spirit of the invention.

Figure 2:
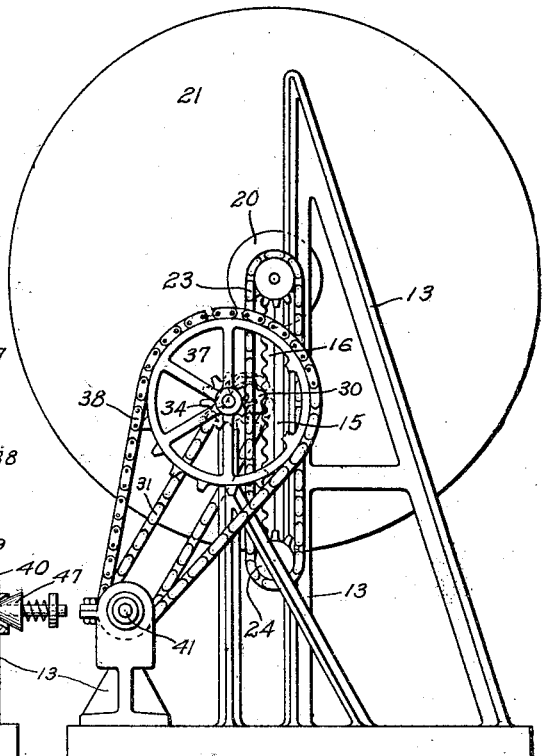
Fig. 2 is a rear view thereof.
Figure 3:
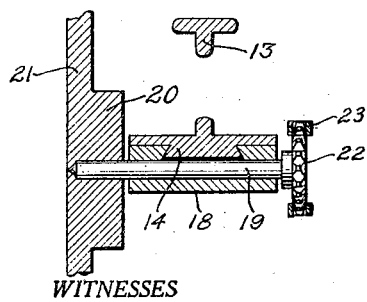
Fig. 3 is a section taken on the line 3—3 of Fig. 1.

In order that it may be possible to examine minutely large maps and maps containing many details, I have provided a form of the invention, shown in Figs. 1, 2 and 3. In this form of the invention, I have provided a base 12 on which a vertical frame such as 13 is mounted. This frame is provided, as shown in the drawings, with a track 14 which engages with a groove in a carriage 15 and which is slidable thereon, this carriage on its front face being provided preferably with a pair of racks 16 and 17, and on its upper end carries a fixed sleeve 18 which is moved up and down with the carriage. Through this sleeve passes a shaft 19 on the outer end of which is a collar 20 and the disk or map mounting 21. A map 21ª is shown mounted in any suitable position on the disk 21, the edge of the disk being marked with directional units so that the relative direction between two points can be readily determined. On the other end of shaft 19 is a sprocket wheel 22 with which engages a chain 23. This chain at its lower end engages with a sprocket 24 mounted on an idler shaft 25 supported in a bearing 26 carried on the carriage with the racks 16 and 17 and the sleeve 18.

The racks 16 and 17 are engageable with gears 27 and 28 mounted on a shaft 29, this shaft carrying a sprocket 30 over which a chain 31 extends, this chain on its lower end engaging a sprocket 32 carried by a rotatable bushing 33 mounted on a portion of the frame 13. Therefore, the rotation of the bushing will cause the rotation of gears 27 and 28 and the vertical movement of the racks 16 and 17 and thereby the vertical movement of the carriage 15 with the shaft 19 and the disk 21.

The rotation of the disk on the shaft 19 is effected by the engagement of a sprocket 34 with the chain 23, said sprocket being mounted on a shaft 35 carried by a pedestal member 36 mounted on the base 12, the other end of this shaft carrying a sprocket 37 engaging with a chain 38, which chain on its other end engages with a sprocket 39 carried by a rotatable bushing 40 mounted on the lower portion of the frame 13.

Passing through the bushings 33 and 40 is a manually rotatable shaft 41 adapted to be rotated by a hand wheel 42 mounted near the front of the machine and journaled at its end in a bearing 43 mounted on a front plate 44 which also carries a telescope 45 through which the observer may note the finer details of any map which may be located on the front face of the disk 21. This telescope is provided with a hair line which corresponds to the hair line 4 of Fig. 1. This shaft 41 is provided with spring-pressed clutch members 46 and 47 disposed at opposite ends thereof and engageable, respectively, with the rotatable bushings 33 and 40. Intermediate the length of this shaft between the bushings are located slidable and non-rotatable bushings 48 and 49 which are associated with spring 50 and 51. These springs may be respectively placed under compression by the movement of a flange 52 carried on the shaft 41 intermediate these longitudinally movable but non-rotatable bushings so that as the shaft is moved in one direction or another longitudinally one or the other of these non-rotatable bushings is moved. The outer ends of these non-rotatable bushings are provided with clutch faces adapted to engage corresponding faces of the rotatable bushings 33 and 40.

Figure 4:
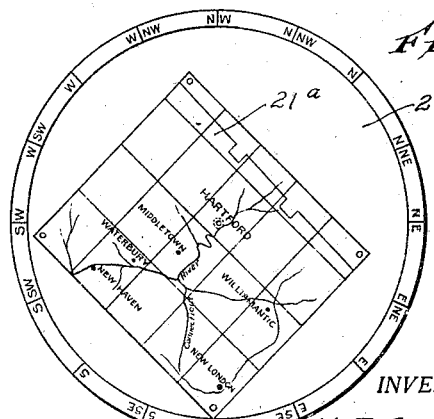
Fig. 4 is an elevation of the front of the disk 21 on reduced scale showing a map mounted thereon.

In the position shown in Fig. 4, shaft 41 has been moved to the right as far as it will go, and in this position the clutch member 46 is engaged with the rotatable bushing 33, whereby the chain 31 can be moved to move the carrier and thereby the disk 21 in a vertical direction. At the same time, the slidable non-rotatable bushing 48 is moved away from the other end of the rotatable bushing 33, whereas the slidable bushing 49 is moved to engage with the rotatable bushing 40, so that this last-mentioned bushing cannot rotate, the clutch member 47 at the end of the shaft being disengaged from the rotatable bushing 40, so that in this position of the shaft 41 the carrier is being moved up and down but the disk thereon cannot be rotated. It is obvious that if the shaft is pulled outward the reverse connection will be made, so that the disk may be rotated and the carrier cannot be moved up and down.

Therefore, by providing a map on the disk 21, placing it thereon in a manner similar to the disposition of the map on the disk shown in Figure 1, and by causing the elevation of the carriage and the rotation of the disk as desired, any portion of the map may be brought within the observation of the person looking through the telescope 45, so that the details of the country can be observed and, at the same time, the proper course to pursue noted in the same manner and by the same means as previously described.

This device, therefore, includes a mechanism which is simple and efficient and which can be very quickly and easily adjusted in any desired position for observation by the manipulation of a single hand wheel and the manipulation in only two directions of a shaft, the entire operation otherwise being automatic.

What I claim is:—

1. A map mounting or support which includes a frame vertically disposed, a carriage slidable with respect to said frame, a disk mounted on said carriage for rotation, mechanical gearing means connected to said carriage to move it in a vertical plane, gear elements conected to said disk for rotation of it on the carrier, a manually operable shaft, and means disposed adjacent the shaft and adapted to connect it to the respective sets of gearing elements as the shaft is selectively moved in one direction or another for a separate and independent movement of the carriage and the disk thereon.

2. A map mounting or support which includes a vertical frame, a carriage slidable thereon, a disk rotatably mounted on the carriage, the carriage having a track, a gear engaging said track, a shaft on which said disk is mounted, a power shaft, a pair of rotatable bushings surrounding said shaft and rotatably independent thereof, power connections between said bushings, said track and the disk shaft, means on said power shaft to selectively engage said bushings for rotation thereof whereby the disk may be rotated and the carriage moved in a vertical plane, independently of each other, and means associated with the rotatable bushing and the power shaft for holding one bushing in a non-rotatable condition while the other bushing is being rotated.

HARRY FRANK AMMIDOWN.